Patented Feb. 14, 1933

1,897,626

UNITED STATES PATENT OFFICE

ARLEY H. VOSS, OF LA GRANGE, ILLINOIS, ASSIGNOR TO WESTERN ELECTRIC COMPANY, INCORPORATED, OF NEW YORK, N. Y., A CORPORATION OF NEW YORK

METHOD OF PRODUCING RUBBER ARTICLES

No Drawing. Application filed December 23, 1929. Serial No. 416,209.

This invention relates to a method of producing rubber articles, and more particularly to a method of producing molded hard rubber articles having sufficient strength to be used in telephone apparatus and for like uses.

An object of the invention is to provide an improved method whereby rubber articles of superior quality may be produced quickly and economically.

In one embodiment of the invention, hard rubber, which has been completely vulcanized, is reduced to a dust or powder and is then mixed with an accelerator of vulcanization, and the resulting mixture is then placed in the usual molding and vulcanization press where it is subjected to heat at a vulcanizing temperature. The time necessary to produce the finished article from the press is about half that usually required, and the vulcanizing temperature may be reduced to somewhat less than that ordinarily necessary.

Further objects of the invention will be apparent from the following description of a preferred embodiment thereof.

The hard rubber used as a starting material in this process may be scrap, or may be specially prepared for use in the process. It is completely vulcanized and is of such hardness that it may be reduced to a powder which will pass a 40-mesh or finer screen. To this powder is added a quantity of an accelerator, preferably in the form of a fine dust or powder, as this permits a more intimate commingling of the ingredients than where a liquid accelerator is used. As an example of the preferred proportions, one pound of diorthotolylguanidine and one pound of tetramethylthiuramdisulphide in powdered form may be added to 100 pounds of hard rubber dust, the ingredients being then thoroughly mixed together and placed in the usual heated molding and vulcanizing dies, where heat and pressure are applied to cause the particles of rubber to fuse into a plastic mass of the shape desired in the finished product. The usual method of forming articles from hard rubber dust requires a curing period of 25 to 30 minutes at a temperature of 380° to 420° F., but the method of this invention makes it possible to reduce the curing time by about one-half and the temperature need not be higher than 325° to 350° F., corresponding to about 150 pounds steam pressure. Due to the curing at a lower temperature and in a shorter time, the resulting product appears to be about as strong as the original hard rubber from which the powder was made, probably because the structure of the rubber hydrocarbon has not been broken down by excessive heat.

It is not known definitely what action takes place during the curing period, but it is thought that the pulverization of the hard rubber causes the breaking up and dispersion of the free sulphur particles, and the presence of the accelerator during the heating reactivates the sulphur which combines with the rubber to form a more homogeneous product than could be obtained otherwise. It is known that pulverizing and remolding rubber at a high temperature will result in reducing the percentage of free sulphur contained therein, but the addition of an accelerator as above described makes it possible to complete the remolding operation in a much shorter time.

The articles formed by the above described process will be found to have sufficient strength to permit their use in telephone apparatus and other apparatus where a moderately strong composition is required.

While the invention has been described with reference to a particular embodiment thereof, various modifications may be made therein, and the appended claims are intended to cover such modifications as fall within the spirit of the invention.

What is claimed is:

1. The method of producing hard rubber articles, which comprises heating finely comminuted hard vulcanized rubber in the presence of a powdered accelerator, and simultaneously compressing the rubber into the desired form.

2. The method of producing hard rubber articles, which comprises reducing hard rubber scrap to powder, mixing therewith a powdered accelerator, and molding the resulting mixture under heat and pressure.

3. The method of producing hard rubber articles, which comprises adding a powdered accelerator to powdered completely vulcanized hard rubber, and molding the mixture at a temperature of approximately 350° F. for a period of about ten minutes.

4. A method of producing hard rubber articles which comprises finely comminuting vulcanized hard rubber to break up the free sulphur particles therein, adding a powdered accelerator, and molding the resulting mixture at a relatively low vulcanizing temperature under pressure.

In witness whereof, I hereunto subscribe my name this 30th day of November A. D., 1929.

ARLEY H. VOSS.